United States Patent
Gorbold et al.

(10) Patent No.: US 11,663,100 B2
(45) Date of Patent: May 30, 2023

(54) SERIAL INTERFACE WITH IMPROVED DIAGNOSTIC COVERAGE

(71) Applicant: Analog Devices International Unlimited Company, Limerick (IE)

(72) Inventors: Jeremy R. Gorbold, Newbury (GB); Gavin Cosgrave, Enniscorthy (IE); Gautham Lakkur, Bangalore (IN)

(73) Assignee: Analog Devices International Unlimited Company, Limerick (IE)

( * ) Notice: Subject to any disclaimer, the term of this patent is extended or adjusted under 35 U.S.C. 154(b) by 256 days.

(21) Appl. No.: 16/935,153

(22) Filed: Jul. 21, 2020

(65) Prior Publication Data

US 2021/0374022 A1 Dec. 2, 2021

(30) Foreign Application Priority Data

Jun. 2, 2020 (IN) .............................. 202041023088

(51) Int. Cl.
*G06F 11/22* (2006.01)
*G06F 11/10* (2006.01)
*G06F 13/42* (2006.01)

(52) U.S. Cl.
CPC ........ *G06F 11/221* (2013.01); *G06F 11/1004* (2013.01); *G06F 13/4282* (2013.01)

(58) Field of Classification Search
CPC . G06F 11/221; G06F 11/1004; G06F 13/4282
USPC .......................................................... 714/43
See application file for complete search history.

(56) References Cited

U.S. PATENT DOCUMENTS

| 4,780,814 | A | 10/1988 | Hayek |
| 7,007,099 | B1 | 2/2006 | Donati et al. |
| 8,887,022 | B2 | 11/2014 | Hammerschmidt et al. |

(Continued)

FOREIGN PATENT DOCUMENTS

| CN | 105468563 B | 6/2018 |
| CN | 108470013 A | 8/2018 |

(Continued)

OTHER PUBLICATIONS

International Search Report and Written Opinion issued in PCT/EP2021/064181 dated Sep. 9, 2021, 16 pages.

(Continued)

*Primary Examiner* — Yair Leibovich
(74) *Attorney, Agent, or Firm* — ArentFox Schiff LLP

(57) ABSTRACT

A serial interface, such as a serial peripheral interface (SPI), with improved diagnostic coverage is disclosed. The serial interface includes a data verification module that selects an error detection value in response to a mode signal indicating if the transmitting device is in user mode or test mode. For example, the data verification module computes a cyclic redundancy check (CRC) value and selects either the computed CRC value or its inverse based on the mode. The receiving device can determine the mode of the transmitting device based on the error detection value used. The serial interface further includes a read detector for clearing the transmit data buffer after data is read out. The serial interface may further include a loopback circuit for verifying that the data output from an output pin matches the data from the transmit data buffer.

19 Claims, 4 Drawing Sheets

(56) References Cited

U.S. PATENT DOCUMENTS

| | | | | |
|---|---|---|---|---|
| 2009/0054075 | A1* | 2/2009 | Boejer | H04B 7/18532 342/357.49 |
| 2011/0246857 | A1* | 10/2011 | Bae | G06F 11/1004 714/763 |
| 2020/0073691 | A1* | 3/2020 | Tsirkin | H04L 63/105 |

FOREIGN PATENT DOCUMENTS

| | | |
|---|---|---|
| CN | 105528325 B | 1/2019 |
| KR | 101637998 B1 | 7/2016 |

OTHER PUBLICATIONS

Maxim et al., *The Method of Data Exchange Between High Performance PWM Modulator and MCU*, XIII Interntional Conference and Seminar on Micronanotechnologies and Electron Drives EDM 2012, 5 pages.

*Hybrid Memory Cube Specification 2.0*, Hybrid Memory Cube Consortium, 2014 Altera Corporation, 126 pages.

*TMS320DM646x DMSoCSerial Peripheral Interface (SPI)*, User's Guide, Texas Instruments, Mar. 2011, 45 pages.

Kavanagh, *Cyclic Redundancy Checking Ensures Correct Data Communications*, Analog Dialogue 45-02 Back Burner, Feb. 2011, 1 page.

Bramta et al., *Implementation of SPI Protocol Using Error Correcting Technigues*, Journal of Emerging Technologies and Innovative Research (JETIR), Jun. 2015, vol. 2, Issue 6, JETIR (ISSN-2349-5162), 3 pages.

English Translation (via epo.org Patent Translate) of CN105468563B, 35 pages (see 4 above).

English Translation (via epo.org Patent Translate) of CN105528325B, 12 pages (see 5 above).

English Translation (via epo.org Patent Translate) of CN108470013A, 10 pages (see 6 above).

English Translation (via eop.org Patent Translate) of KR20160060181B1, 1 page (see 7 above).

* cited by examiner

SERIAL INTERFACE WITH IMPROVED DIAGNOSTIC COVERAGE

PRIORITY DATA

This application claims priority to India Provisional Patent Application Number 202041023088, filed Jun. 2, 2020, entitled "SERIAL PERIPHERAL INTERFACE (SPI) WITH IMPROVED DIAGNOSTIC COVERAGE," which is hereby incorporated by reference in its entirety.

TECHNICAL FIELD OF THE DISCLOSURE

The present invention relates to the field of communications interfaces, in particular to techniques for detecting errors in serial interfaces, such as serial peripheral interfaces (SPIs).

BACKGROUND

SPI is a synchronous serial communication interface used for short-distance communications between devices. For example, SPIs are used to send data between microcontrollers and small peripherals such as shift registers, sensors, and SD cards. An SPI connects a master device to one or more slave devices. The master device provides a clock signal and a select signal. In addition, two data lines connect the master device to the slave device: one line for sending data from the master to the slave, and another for sending data from the slave to the master. SPIs allow full duplex communication in which both devices can push data to the other device simultaneously.

Some SPIs perform diagnostic checks to ensure that the data received at a device from a connected transmitting device is correct. For example, some SPIs use frame counters to ensure that sequential frames are properly received, e.g., that the received data block is not a repetition of a prior block, and that a data block has not been missed. In addition, some SPIs compute a cyclic redundancy check (CRC) value on the data prior to transmission, and the recipient SPI uses the CRC value to check for errors in the received data. While these diagnostic techniques catch certain transmission errors, they cannot fully ensure that data received through an SPI is current, correct, and error-free.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
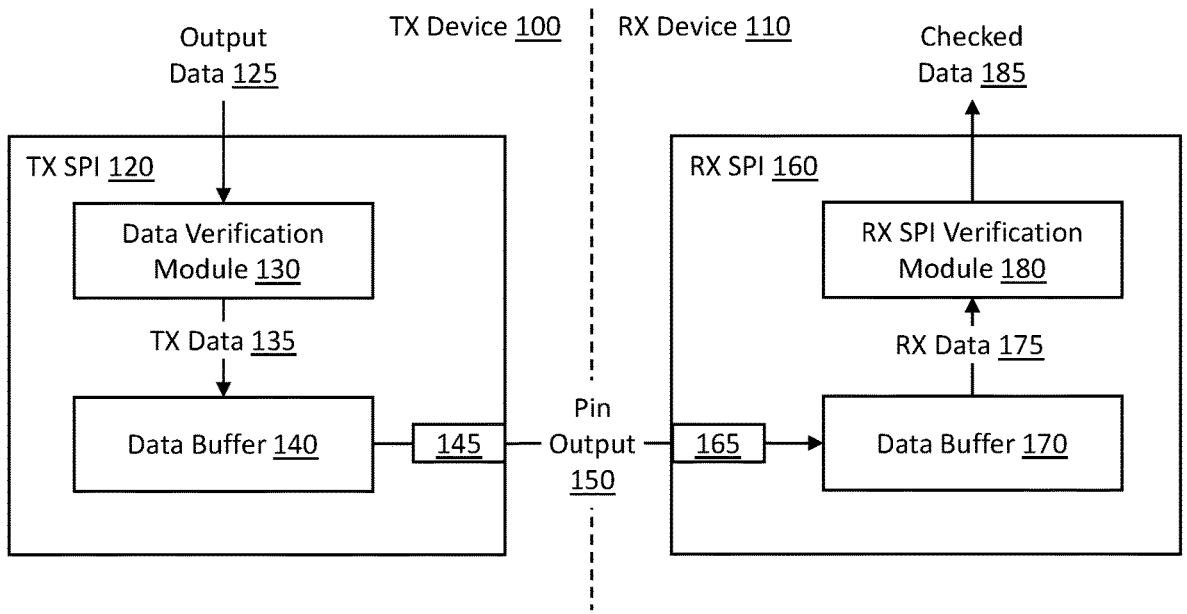
FIG. 1 is a block diagram of an SPI connecting a transmit device and a receiving device, according to some embodiments of the present disclosure.

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

Current serial interfaces use diagnostics to confirm that the data received at a recipient device is current and correct. For example, the ISO (International Organization for Standardization) standard 26262 recommends the use of a CRC and a frame counter in serial peripheral interfaces (SPIs). However, current serial interfaces have potential gaps in their diagnostic coverage, even when CRCs and frame counters are used. For example, in a transmitting portion of an SPI, data in a buffer is read out from the buffer and transmitted off the SPI on an output pin. Current diagnostic techniques do not check that data is read correctly from the buffer and travels through the output pin without error. For example, current diagnostic techniques may not discern if the output pin is jammed, or if it is experiencing noise or collision. As another example, current diagnostics do not indicate if the transmitting device is not in user mode; the transmitting device may transmit test or debug data that masquerades as user data.

Serial interfaces with improved diagnostic coverage are disclosed. A serial interface forms a communication connection between two devices, referred to herein as a transmitting device and a receiving device. The transmitting device includes a transmitting portion, and the receiving device includes a receiving portion. In the context of an SPI, the transmitting portion is also referred to as a TX SPI, and the receiving portion is also referred to as an RX SPI. The transmitting portion implements one or more diagnostic techniques that enable the receiving portion to detect potential errors in the transmitting portion or the transmission channel. In serial interfaces that enable duplex communication, it should be understood that the roles of the transmitting portion and receiving portion can be reversed, i.e., both devices can act as a transmitting device, and both devices can act as a receiving device, and the devices can simultaneously transmit and receive data according to the processes described herein.

In some embodiments, the transmitting portion uses an error detection code, such as a CRC polynomial, to generate an error detection value, such as a CRC value, for transmission to the receiving portion. The transmitting portion selects the error detection value based on whether the transmitting device is in user mode or test mode. For example, the error detection value selected in test mode is the inverse of the error detection value selected in user mode. The receiving portion can determine whether the transmitting device is in user mode or test mode based on the error detection value, e.g., by determining whether the error detection value was inverted or not. Inverting the error detection value during test mode prevents test data transmitted from the transmitting portion from masquerading as user data. For example, if the error detection value transmitted during test mode is the inverse of the error detection value transmitted during user mode, there is a low likelihood that a given data block would produce the inverted error detection value, even if the data block contained errors.

In some embodiments, the transmitting portion stores data for transmission in a data buffer that is cleared after the stored data is read out of the buffer. For example, the transmitting portion includes a read detector that detects data being read out from the data buffer to the output pin. The read detector provides a clear signal to the data buffer, which clears stored data in response to the clear signal. This prevents the same block of data from being transmitted twice from the transmitting portion and prevents stale data from masquerading as current data.

In some embodiments, the transmitting portion includes a loopback circuit that compares data from the output pin to a copy of the data that was stored in the data buffer. The loopback circuit confirms that the data transmitted through the output pin matches the data from the data buffer, e.g., that the output pin is transmitting the correct data. If the loopback circuit determines that the data transmitted through the output pin does not match the data copied from the data buffer, the transmitting portion transmits a flag to the receiving portion, e.g., in the next data frame, or through a separate pin. The loopback circuit can detect if there is a fault between the data buffer and the output pin, or if the pin itself is temporarily jammed or affected by noise.

A serial interface that uses different error detection values in user and test mode, implements clear-on-read, and/or includes the loopback circuit closes diagnostic gaps in prior serial interfaces, e.g., prior SPIs. A serial interface that incorporates this combination of features has an increased chance of detecting stale data and detecting faults in the transmitting portion. This is especially useful in safety contexts in which faulty or old data can lead a system to make erroneous decisions.

Embodiments of the present disclosure provide a serial interface comprising a data verification module and a data buffer. The data verification module is configured to select a first error detection value in response to a mode signal indicating a user mode; select a second error detection value in response to the mode signal indicating a test mode, the second error detection value different from the first error detection value; and generate transmit data for transmitting to a receiving device, the transmit data comprising output data and the selected one of the first error detection value and the second error detection value. The data buffer is configured to store the transmit data, the transmit data received at the data buffer from the data verification module; output the transmit data to an output pin; and, in response to receiving a clear signal from a read detector, clear the transmit data stored in the data buffer.

Embodiments of the present disclosure further provide a serial interface comprising a data buffer and a verification module. The data buffer is configured to store received data comprising a data block and an error detection value generated using an error detection code, the received data transmitted to the serial interface from a second serial interface of a transmitting device, the transmitting device alternately set in a user mode or a test mode. The verification module is configured to retrieve the received data from the data buffer; process the data block and the error detection value with the error detection code to attempt to verify the data block; process the data block and an inverse of the error detection value with the error detection code to attempt to verify the data block; and output a signal indicating that the transmitting device is set in the test mode in response to verifying the data block and the inverse of the error detection data with the error detection code.

Embodiments of the present disclosure further provide a method for transmitting data through a serial interface that includes receiving data for transmitting from the serial interface to a receiving device; selecting one of a first error detection value and a second error detection value in response to a mode signal, the first error detection value indicating a user mode, the second error detection value indicating a test mode; generating transmit data for transmitting to the receiving device, the transmit data comprising the received data and the selected first or second error detection value; storing the transmit data in a data buffer; outputting the transmit data from the data buffer to an output pin; and, in response to a clear signal indicating that the transmit data has been read from the data buffer, clearing the transmit data from the data buffer.

As will be appreciated by one skilled in the art, aspects of the present disclosure, in particular aspects of providing diagnostic coverage on a serial interface, and transmitting and receiving data through the serial interface with improved diagnostic coverage, described herein, may be embodied in various manners (e.g., as a method, a system, a computer program product, or a computer-readable storage medium). Accordingly, aspects of the present disclosure may take the form of a hardware embodiment, a software embodiment (including firmware, resident software, microcode, etc.), or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

Example SPI Bus Between Two Devices

FIG. 1 is a block diagram of an SPI connecting a transmitting device and a receiving device, according to some embodiments of the present disclosure. The SPI shown in FIG. 1 and described with respect to FIGS. 2-7 is an example of a serial interface in which the diagnostic techniques described herein may be implemented. In other embodiments, other types of serial interfaces may incorporate the diagnostic techniques described herein.

A transmit (TX) device 100 and a receive (RX) device 110 are connected by an SPI that includes a transmitting portion, referred to as TX SPI 120, and a receiving portion, referred to as RX SPI 160. The TX SPI 120 receives output data 125 from the TX device 100. The output data 125 is a data block of fixed length. The TX SPI 120 may receive a series of data blocks from the TX device 100 for transmitting to the RX device 110 in series. For example, if the TX device 100 is a sensor, and the RX device 110 is a system for processing sensor data, the output data 125 is sensor data, or a portion of sensor data, transmitted from the TX device 100 to the RX device 110 for processing. As another example, the TX device 100 is a system for processing sensor data, the RX device 110 is a sensor, and the output data 125 is an instruction, or a portion of an instruction spread over multiple data blocks, from the processing system to the sensor.

Figure 4:
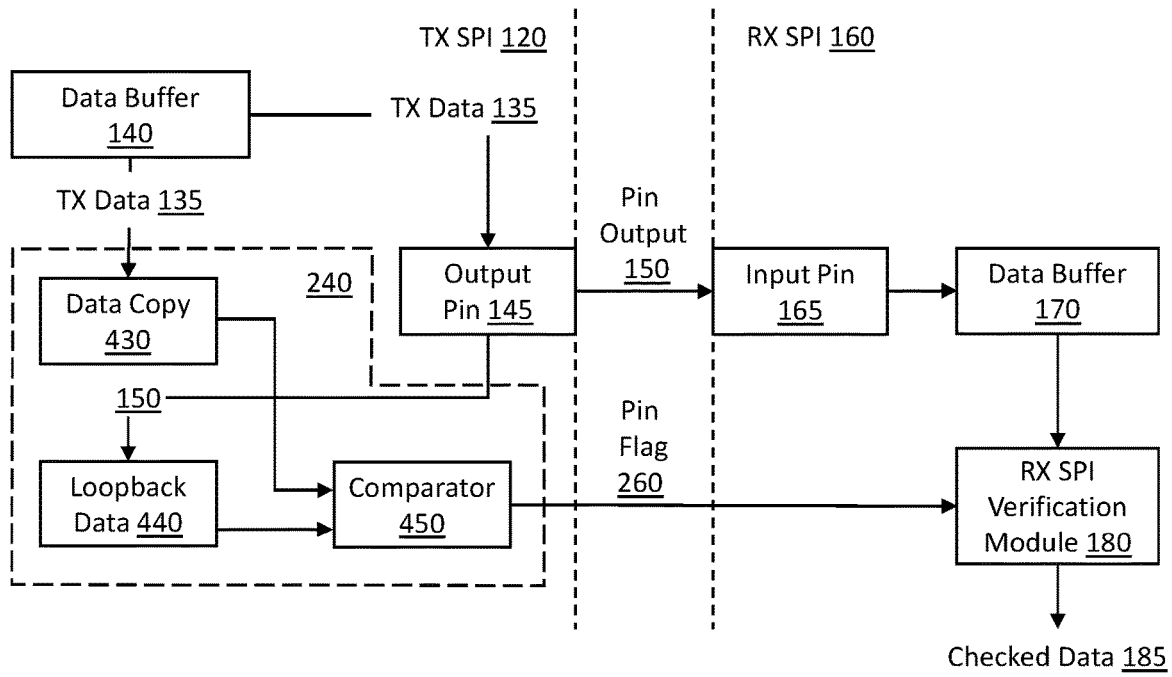
FIG. 4 is a block diagram of the transmit SPI and receive SPI showing the loopback circuit of the transmit SPI, according to some embodiments of the present disclosure.
Figure 5:
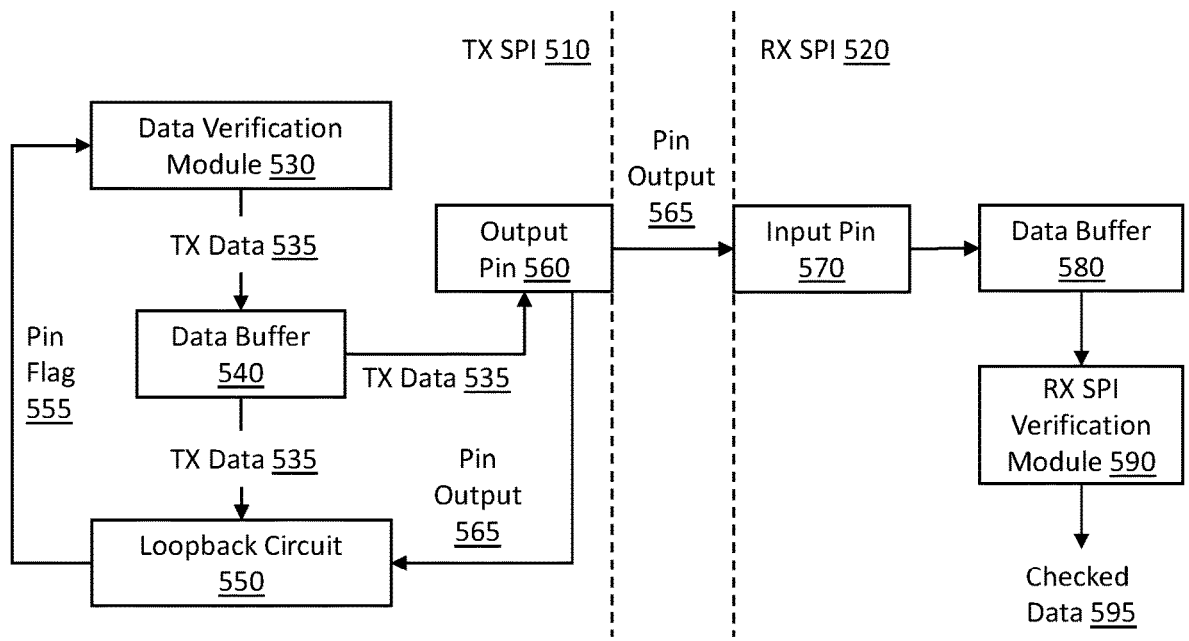
FIG. 5 is a block diagram of an alternate arrangement for transmitting a signal from the loopback circuit from a transmit SPI to a receive SPI, according to some embodiments of the present disclosure.
Figure 6:
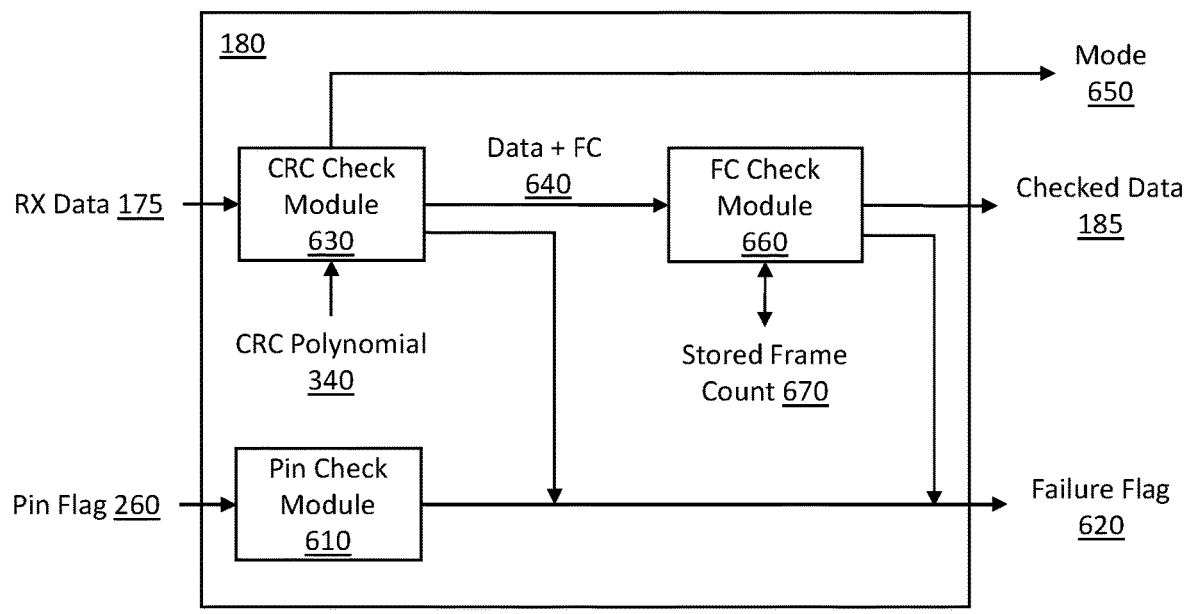
FIG. 6 is a block diagram of a verification module of the receive SPI, according to some embodiments of the present disclosure.

The TX SPI 120 includes a data verification module 130 for processing the output data 125. The data verification module 130 selects an error detection value calculated based on the output data 125 and outputs the selected error detection value and output data 125 as TX data 135. The data verification module 130 is described further with respect to FIG. 3. A data buffer 140 stores the TX data 135 output by the data verification module 130. The TX SPI 120 transmits the data in the data buffer 140 through an output pin 145. Further details of the TX SPI 120 are shown in FIGS. 2-5. The pin output 150 is received at an input pin 165 of the RX SPI 160. If the TX SPI 120 is operating properly, the pin output 150 matches the TX data 135. The data received at the input pin 165 is stored in a data buffer 170, and an RX SPI verification module 180 reads the RX data 175 from the data buffer 170. The RX SPI verification module 180 checks that the RX data 175 is current and correct and outputs the checked data 185 to another component of the RX device 110. Further details of RX SPI verification module 180 are shown in FIG. 6.

While one direction of data flow (from the TX device 100 to the RX device 110) is shown in FIG. 1 and described throughout the specification, this is merely an exemplary data flow. SPIs enable bidirectional communication, and the roles of TX device 100 and RX device 110 can be reversed, i.e., the RX device 110 can transmit data from the RX SPI 160 to the TX SPI 120. Furthermore, the components shown in each of the SPIs 120 and 160 may be duplicated in the other SPI. In particular, the TX SPI 120 has the data verification module 130 and transmit data buffer 140 shown in FIG. 1, as well as a received data buffer and RX SPI verification module (not shown in FIG. 1); the RX SPI 160 has the RX SPI verification module 180 and received data buffer 170 shown in FIG. 1, as well as a transmit data buffer and data verification module (not shown in FIG. 1).

FIG. 1 omits various standard elements of SPIs for simplicity. For example, in addition to a second data line from the RX SPI 160 to the TX SPI 120, two additional lines for a serial clock signal and a slave select signal form the SPI bus. Additional logic for handling the clock signal and slave select signal are included in the SPI. One of the TX SPI 120 and RX SPI 160 is considered an SPI master and the other an SPI slave. While only two devices are shown in FIG. 1, the SPI master may be connected to multiple SPI slaves. For example, if the TX SPI 120 is the master, the TX SPI 120 may transmit data to another slave device in addition to the RX SPI 160, and use the slave select signal to select one of the connected slave devices.

Example Transmit SPI With Diagnostic Features

Figure 2:
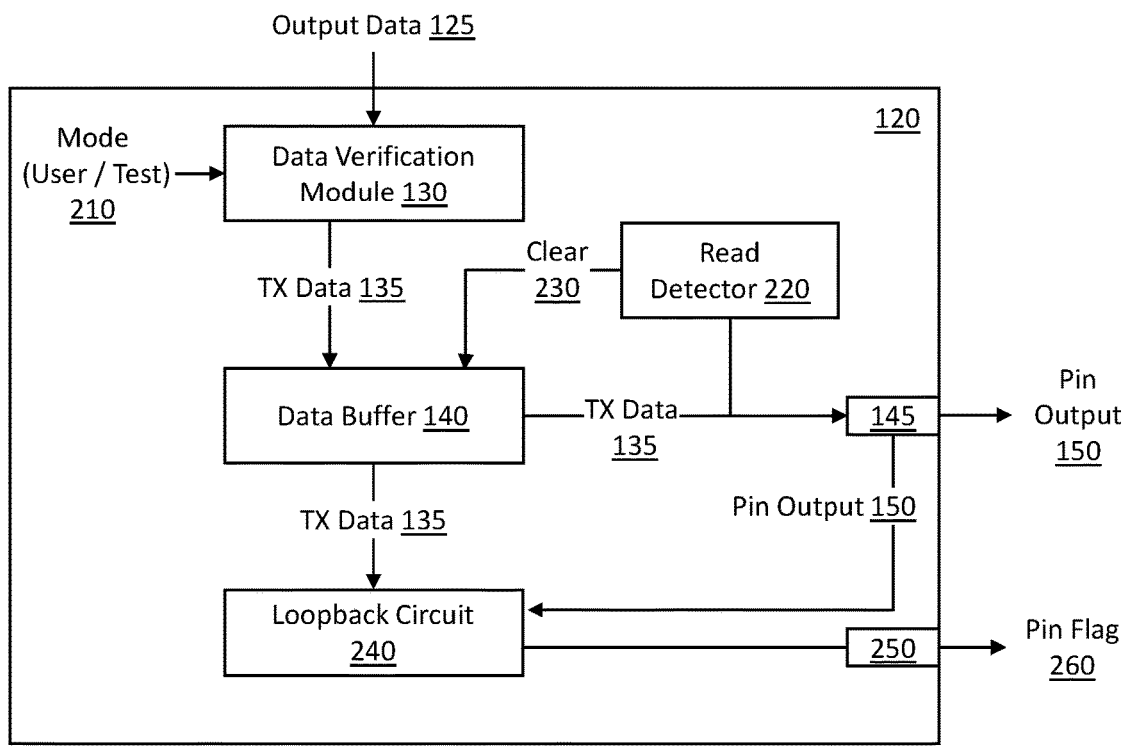
FIG. 2 is a block diagram of the transmitting portion of the SPI, according to some embodiments of the present disclosure.

FIG. 2 is a block diagram of the TX SPI 120, according to some embodiments of the present disclosure. The TX SPI 120 includes the data verification module 130 and data buffer 140 shown in FIG. 1, as well as a read detector 220 and a loopback circuit 240. The TX SPI 120 shows two output pins: output pin 145 for outputting the TX data 135, and a flag pin 250 for outputting a pin flag 260. As mentioned above, the TX SPI 120 has additional pins not shown in the figures for a clock signal, a select signal, and a received data signal. In some embodiments, the flag pin 250 is not included. In such embodiments, either the pin flag 260 is omitted, or the pin flag 260 is transmitted from the loopback circuit 240 to the data verification module 130 for inclusion in the TX data 135. An example where the pin flag is included in the TX data is shown in FIG. 5.

The data verification module 130 receives the output data 125 provided by another component of the TX device 100 for transmission via the SPI to the RX device 110. The data verification module 130 also receives a mode signal 210 indicating if the TX device 100 is operating in a user mode or a test mode. The data verification module 130 is configured to select between two error detection values based on the mode signal 210, i.e., selecting a first error detection value in response to the mode signal 210 indicating that the TX device 100 is in the user mode, and selecting a second, different error detection value (e.g., the inverse of the first error detection value) in response to the mode signal 210 indicating that the TX device 100 is in test mode. The data verification module 130 processes the output data 125 with an error detection code to generate at least one of the error detection values. The data verification module 130 appends the selected error detection value to the output data 135 to generate TX data 135 for transmitting to the RX device 110. The RX SPI 160 can use the error detection value and the same error detection code used by the data verification module 130 to confirm that it correctly received the output data 125, and to determine if the TX device 100 is in user mode or test mode. Further details of an example data verification module 130 are shown in FIG. 3.

The data buffer 140 receives the TX data 135 generated by the data verification module 130. The TX data 135 includes the output data 125 and the selected error detection value appended to the output data 125. The TX data 135 may further include a frame count, a pin flag, and/or other data that can be used by the RX SPI 160 to verify the data it receives from the TX SPI 120. The data buffer 140 stores the TX data 135 before it is transferred off the TX device 100. The TX data 135 is transmitted from the data buffer 140 to the output pin 145 and off the TX device 100. The read detector 220 monitors the line between the data buffer 140 and the output pin 145 and detects transmission of the TX data 135 from the data buffer 140 to the output pin 145. The read detector 220 transmits a clear signal 230 to the data buffer 140 in response to detecting that data was read out of the data buffer 140. In response to receiving the clear signal 230 from the read detector 220, the data buffer 140 clears its stored data. This prevents the same data from accidentally being read out of the data buffer 140 and transmitted to the RX SPI 160 multiple times.

A loopback circuit 240 verifies that the data output by the output pin 145 matches the TX data 135. The loopback circuit 240 receives a copy of the TX data 135 from the data buffer 140. The loopback circuit 240 also receives a copy of the pin output 150 from the output pin 145. The loopback circuit 240 compares the pin output 150 to the TX data 135 received from the data buffer 140. In response to the pin output 150 not matching the TX data 135, the loopback circuit 240 outputs a pin flag 260. In this example, the pin flag 260 is output via a different pin from the output pin 145. In some embodiments, the pin flag 260 may be output over an existing line of the SPI bus (e.g., the clock line, select line, or the other data line). In other embodiments, the pin flag 260 may be output over a separate, additional line. In another embodiment, the pin flag 260 is output over the transmit data line (i.e., the line between the output pin 145 and the input pin 165 of the RX SPI 160). An example of this embodiment is shown in FIG. 5. Further details of an example loopback circuit 240 are shown in FIG. 4.

Figure 3:
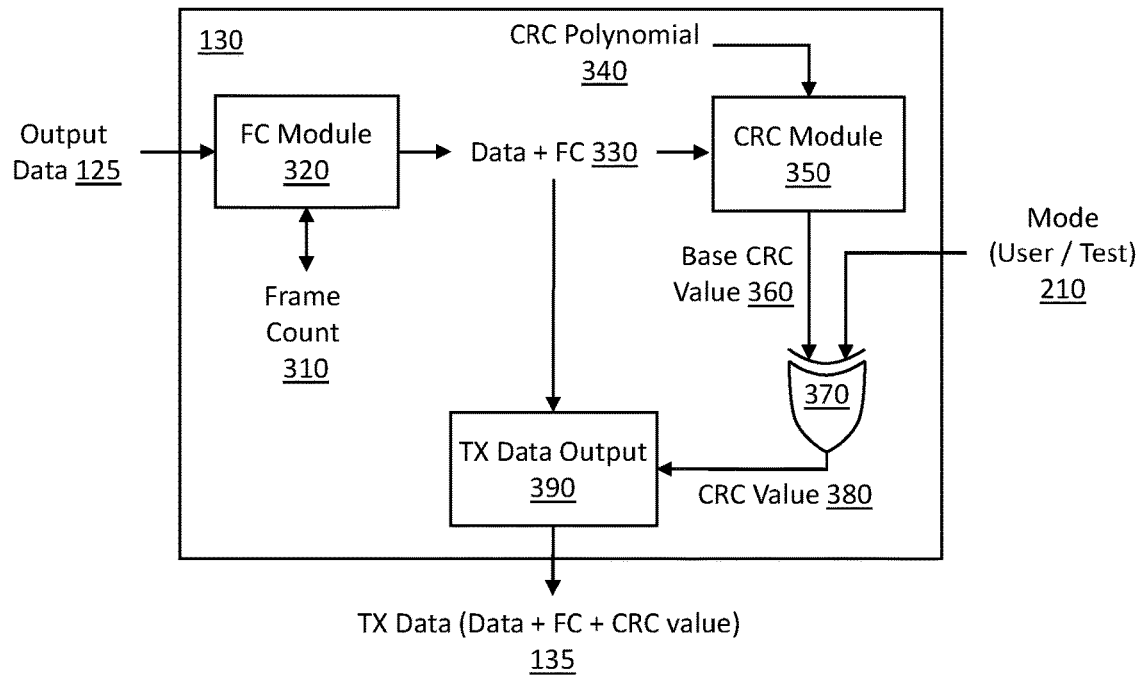
FIG. 3 is a block diagram of the transmit data verification module of the transmit SPI, according to some embodiments of the present disclosure.

FIG. 3 is a block diagram of the data verification module 130 of the transmit SPI, according to some embodiments of the present disclosure. In this example, the data verification module 130 adds a frame count to the output data 125, computes a cyclic redundancy check (CRC) on the output data and the frame count to generate a CRC value, and selects either the CRC value or its inverse based on the device mode. In other embodiments, alternate error detection processes may be used.

The data verification module 130 includes a frame count (FC) module 320, a CRC module 350, a CRC value selector 370, and TX data output 390. In response to receiving the output data 125, the FC module 320 retrieves a stored frame count 310 from a memory. The FC module 320 appends the frame count 310 to the output data 125 to generate the data with appended FC 330. The FC module 320 may append the frame count 310 at the beginning of the output data 125 or at the end of the output data 125. The FC module 320 passes the data with appended FC 330 to the CRC module 350 and to the TX data output 390. In addition, the FC module 320 increments the frame count 310, or replaces the stored frame count 310 with an updated value. The FC module 320 may increment the frame count 310 each time new output data 125 is received and before adding the frame count to the output data, or after adding the frame count to the output data, so long as an incremented frame count is appended to each new block of output data 125.

The CRC module 350 receives a CRC polynomial 340 and the data with appended FC 330. The CRC module 350 computes a CRC value on the data with appended FC 330 by dividing the data with appended FC 330 by the CRC polynomial 340; the CRC value is the remainder of the polynomial division. The CRC module 350 outputs the computed CRC value as base CRC value 360.

The CRC value selector 370 selects an error detection value (here, a CRC value) based on the mode signal 210. In the example shown in FIG. 3, the CRC value selector 370 is an XOR gate that receives the base CRC value 360 at a first input and the mode signal 210 at a second input. The XOR gate inverts the base CRC value 360 when the mode signal 210 is high, and outputs the base CRC value 360 when the mode signal 210 is low. For example, the base CRC value 360 is selected during user mode, when the mode signal 210 is low; during test mode, the mode signal 210 is high, and the XOR gate 370 inverts the base CRC value 360 to generate the test mode CRC value.

The selected CRC value 380 (i.e., either the user mode CRC value or the test mode CRC value) is output to the TX data output 390. The TX data output 390 appends the CRC value 380 to the data with appended FC 330, e.g., to the front or to the back of the data with appended FC 330. The output data 125, appended FC, and appended CRC value together form the TX data 135. The TX data output 390 outputs the TX data 135 to the data buffer 140.

FIG. 4 is a block diagram of the TX SPI 120 and RX SPI 160 showing the loopback circuit 240 of the TX SPI 120, according to some embodiments of the present disclosure. The loopback circuit 240 includes a data copy memory 430, a loopback data memory 440, and a comparator 450. The data copy memory 430 and loopback data memory 440 may be two buffers or other memory blocks.

The data copy memory 430 receives a copy of the TX data 135 from the data buffer 140. When the TX data 135 is read out from the data buffer 140 to the output pin 145, the TX data 135 is also passed to the loopback circuit 240 for storing in the data copy memory 430. In some embodiments, the data buffer 140 has a single output line connected to both the loopback circuit 240 and the output pin 145. In some embodiments, the loopback circuit 240 includes an inverter that inverts the TX data 135 received from the data buffer 140, and the data copy memory 430 stores the inverse of the TX data 135 as the copy of the transmit data.

The loopback data memory 440 receives the pin output 150 from the output pin 145 and stores the pin output 150. In some embodiments, the loopback circuit 240 includes an inverter that inverts the pin output 150 received from the output pin 145, and the loopback data memory 440 stores the inverse of the pin output 150 as the copy of the transmit data.

Data from the data copy memory 430 and loopback data memory 440 are read out to the comparator 450.

The loopback circuit 240 may include a read detector, or a pair of read detectors, for detecting when the TX data copy and loopback data are read out to the comparator 450. In some embodiments, the read detector 220 shown in FIG. 2 may detect reading of the TX data copy and loopback data. The read detector(s) transmit a clear signal to the data copy memory 430 and loopback data memory 440 in response to detecting a read of the memories 430 and 440. For example, if the read detector detects a read on one of the input lines from the data copy memory 430 or the loopback data memory 440 to the comparator 450, and the read detector sends a clear signal to both the data copy memory 430 and loopback data memory 440. As another example, the read detector, or a pair of read detectors, detects reads on each of the input lines to the comparator and send a clear signal to the corresponding memory for which the read was detected (i.e., the data copy memory 430 or loopback data memory 440).

The comparator 450 compares data from the data copy memory 430 and the loopback data memory 440 to determine if the data copy (the TX data 135) matches the loopback data (the pin output 150). For example, the comparator 450 may comprise an XNOR gate, which outputs a high signal if a bit from the data copy memory 430 matches a corresponding bit from the loopback data memory 440, and outputs a low signal if two corresponding bits do not match. If one of the data copy memory 430 or the loopback data memory 440 is inverted, a high signal indicates that a pair of corresponding bits do not match. If any of the pairs of corresponding bits do not match, the comparator 450 outputs a pin flag 260. For example, the pin flag signal is ordinarily low and the comparator 450 raises the pin flag signal to high in response to a mismatch, or vice versa.

In the embodiment shown in FIG. 4, the RX SPI 160 receives the pin output 150 at the input pin 165, which passes the received data to the data buffer 170. The RX SPI 160 receives the pin flag 260 at the RX SPI verification module 180, e.g., through the flag pin 250 shown in FIG. 2 and a corresponding pin in the RX SPI 160. Using a different pin from the pin output 150 and input pin 165 allows the TX SPI 120 to alert the RX SPI 160 of an error in the output pin 145 in the case of a persistent fault. As noted above, in other embodiments, the pin flag 260 is transmitted through the output pin 145, e.g., with the next data block; an example of this is shown in FIG. 5. If the pin flag 260 is not raised and the RX SPI verification module 180 verifies the received data, the RX SPI verification module 180 outputs the checked data 185. In response to receiving the pin flag 260, rather than outputting the checked data 185, the RX SPI verification module 180 may output a signal indicating that the data was corrupted or incorrect. The RX SPI verification module 180 is described further with respect to FIG. 6.

FIG. 5 is a block diagram of an alternate arrangement for transmitting a signal from the loopback circuit from a transmit SPI to a receive SPI, according to some embodiments of the present disclosure. FIG. 5 shows a TX SPI 510 and an RX SPI 520. The TX SPI 510 includes a data verification module 530, a data buffer 540, a loopback circuit 550, and an output pin 560. The data verification module 530 selects an error detection code, compute error detection data (e.g., a CRC value), and outputs TX data 535 that includes the error detection data, as described with respect to data verification module 130. The data buffer 540 is similar to the data buffer 140, and the loopback circuit 550 is similar to the loopback circuit 240. The data buffer 540 receives the TX data 535 and outputs the TX data 535 to the output pin 560 and the loopback circuit 550. The loopback circuit 550 receives the TX data 535 from the data buffer 540 and the pin output 565 from the output pin 560. The loopback circuit 550 compares the TX data 535 to the pin output 565 and outputs the pin flag 555 (e.g., by changing the state of the pin flag signal from low to high) in response to the TX data 535 not matching the pin output 565.

In this embodiment, the pin flag 555 is provided to the data verification module 530. The data verification module 530 appends a pin flag indicator to a block of output data. The data verification module 530 may calculate the error detection data for the output data with the pin flag indicator appended.

In some embodiments, the pin flag indicator is appended into the same block of data to which the pin flag refers. For example, if the primary data (e.g., the output data 125) is transmitted first, followed by some status bits, flags, or other additional data, the loopback circuit 550 checks the pin output 565 for the primary data while additional bits of the data frame are concurrently being transmitted from the output pin 560. The pin flag 555 can then be appended to the end of the data frame to which it refers.

In other embodiments, the block of output data to which the pin flag indicator is appended is a different block from the block to which the pin flag refers; the block to which the pin flag refers finishes transmitting before the loopback circuit 550 generates the pin flag 555, or before the pin flag 555 may be transmitted. In such embodiments, if the loopback circuit 550 generates a pin flag 555 indicating a mismatch for a first data block, a pin flag indicator appended to a second, later data block indicates an error during the transmission for the first data block. The pin flag indicator may be sent a fixed number of data blocks after the data block to which it refers, e.g., in the next data block, or with a gap of one or more data blocks, depending on the timing of the SPI. In some embodiments, a pin flag indicator is transmitted in an empty data block.

The input pin 570 receives the pin output 565, which includes the pin flag indicator. The received data is passed to the data buffer 580 and then to the RX SPI verification module 590. The data buffer 580 may store multiple blocks of data, e.g., a first block of data to which a pin flag indicator on a second block of data refers, and the second block of data that includes the pin flag indicator. The RX SPI verification module 590 verifies the first block of data using the error detection code (e.g., the CRC polynomial 340) and checks the pin flag indicator on the second block of data to ensure that it does not indicate a pin mismatch. If the pin flag indicator indicates a mismatch, the RX SPI verification module 590 outputs a signal indicating that the data was corrupted or incorrect; otherwise (and if the RX SPI verification module 590 verifies the data with the error detection code, verifies the frame count, etc.), the RX SPI verification module 590 outputs checked data 595. Other aspects of the RX SPI verification module 590 are similar to the RX SPI verification module 590 described with respect to FIG. 6.

Example Receive SPI Verification Module

FIG. 6 is a block diagram of the RX SPI verification module 180, according to some embodiments of the present disclosure. In this example, the RX SPI verification module 180 processes a CRC value provided by the TX SPI 120 to verify the received data and to verify that the TX SPI 120 is in user mode, and the RX SPI verification module 180 checks a frame count of the received data. In other embodiments, alternate error detection processes may be used, and the frame count may or may not be used.

The RX SPI verification module 180 includes a pin check module 610, a CRC check module 630, an FC check module 660. The pin check module 610 receives the pin flag 260 from the TX SPI 120. In some embodiments, the pin check module 610 receives the pin flag 260 from a RX flag pin (not shown in FIG. 6) that is connected to a TX flag pin in the TX SPI, such as the flag pin 250 shown in FIG. 2. In other embodiments, the pin check module 610 receives the pin flag 260 in the same data block as the data block presently being verified by the RX SPI verification module 180 or in a later data block than the data block presently being verified by the RX SPI verification module 180, as described with respect to FIG. 5. If the pin flag 260 is received in a later data block, the RX SPI verification module 180 and/or another component of the RX SPI 160 includes memory (e.g., a set of buffers) for storing multiple blocks of data and logic for parsing a block of data to obtain the pin flag 260. If the pin flag 260 indicates a mismatch between the TX data and the pin output on the transmit side, the pin check module 610 outputs a failure flag 620.

The CRC check module 630 receives the RX data 175 from the data buffer 170. The RX data 175 includes at least a data block (e.g., data and appended FC 330) and an error detection value (e.g., the CRC value 380). The CRC check module 630 processes the RX data 175 with an error detection code to verify the RX data 175. In the example shown in FIG. 6, the CRC check module 630 receives the CRC polynomial 340 stored on the RX SPI 160 and attempts to verify the RX data 175 using the CRC polynomial 340. If the CRC check module 630 verifies the RX data 175, this indicates that the RX data 175 was correctly transmitted, and that the TX device 100 is in user mode. In response to a successful verification of the RX data 175, the CRC check module 630 outputs a mode signal 650 indicating that the TX device 100 is in user mode. In some embodiments, if the CRC check module 630 fails to verify the RX data 175, the CRC check module 630 throws a failure flag 620.

In some embodiments, the CRC check module 630 is further configured to invert the error detection value in the RX data 175 and to attempt to verify the data block and the inverse of the error detection value with the CRC polynomial 340. If the CRC check module 630 verifies the data block and the inverse of the error detection value, this indicates that the TX device 100 is in test mode, and the CRC check module 630 outputs a mode signal 650 indicating that the TX device 100 is in test mode. The CRC module 630 may attempt to verify data block and the error detection value (i.e., the received RX data 175) and the data block and the inverted error detection value in parallel. Alternatively, the CRC module 630 may invert the error detection value and attempt to verify the data block and inverted error detection value in response to not verifying the received RX data 175.

In some embodiments, the CRC check module 630 identifies the error detection value that is verified by the CRC polynomial 340 (i.e., the error detection value in the RX data 175 or its inverse) and outputs a mode signal 650 indicating whether the TX device 100 is in user mode or the TX device 100 is in test mode. The mode signal 650 may have a third possible value if neither error detection value can be verified. Alternatively, the mode signal 650 has only two possible states (user mode and test mode), and the mode signal 650 is ignored if the CRC check module 630 fails to verify the data block with either error detection value. If the CRC check module 630 fails to verify the data block with either error detection value, the CRC check module 630 outputs a failure flag 620, indicating that the RX data 175 cannot be verified and should be discarded.

The CRC check module 630 outputs the verified data with appended FC 640, which includes the output data 125 and frame count applied at the TX SPI 120, to a FC check module 660. The FC check module 660 retrieves a stored frame count 670 from memory and extracts the frame count from the data and appended FC 640. The FC check module 660 compares the retrieved frame count 670 to the extracted frame count to verify that the frame count of the received data has incremented correctly relative to a prior block of received data, i.e., that the frame count not the same as the prior block, and that no data blocks were missed. The FC check module 660 increments the stored frame count 670, or replaces the stored frame count 670 with an updated value. If the FC check module 660 verifies that the frame count has correctly incremented, the FC check module 660 outputs the checked data 185, which matches the output data 125. If the FC check module 660 does not verify that the frame count has incremented correctly, the FC check module 660 outputs a failure flag 620.

Example Process for Transmitting Data Through an SPI

Figure 7:
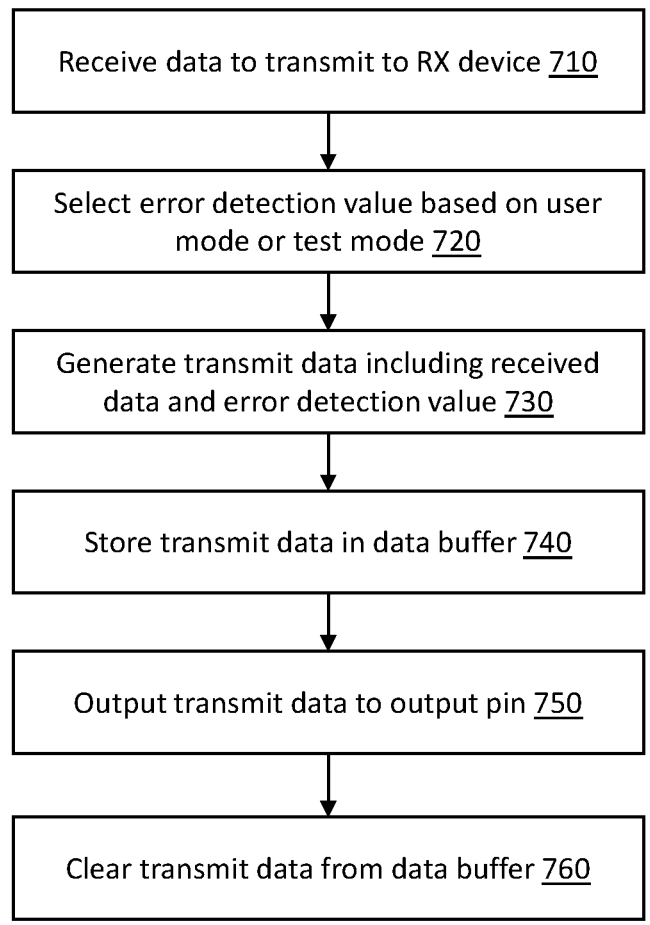
FIG. 7 provides a method for transmitting data from an SPI, according to some embodiments of the present disclosure.

FIG. 7 provides a method for transmitting data through an SPI, according to some embodiments of the present disclosure. The SPI receives 710 data, such as output data 125, to transmit to a receiving device. An SPI (e.g., the data verification module 130 of the TX SPI 120) selects 720 an error detection value based on a mode signal indicating whether the transmitting device is in a user mode or a test mode. For example, the SPI selects a base CRC value when the transmitting device is in user mode, and an inverse of the base CRC value is in test mode. The base CRC value is computed based on the output data 125 using a CRC polynomial. The SPI may select the CRC code using an XOR gate as shown in FIG. 3.

The SPI generates 730 transmit data for transmitting through the SPI. For example, the transmit data includes the received data and the selected error detection code. A frame count and/or other verification data may also be included in the transmit data, e.g., by appending the frame count onto the received data before the CRC value is calculated. Appending the frame count is described with respect to FIG. 3.

The SPI stores 740 the transmit data in a data buffer, such as data buffer 140. The SPI outputs 750 the transmit data from the data buffer to an output pin, such as output pin 145. A read detector, such as read detector 220, detects that the transmit data has been read out from the data buffer 140 and transmits a clear signal to the data buffer 140. The data buffer clears 760 the transmit data in response to the clear signal.

In some embodiments, the pin output data from the output pin is looped back to a loopback circuit, as shown in FIGS. 2, 4, and 5. The loopback circuit compares the pin output data to a stored copy of the transmit data received from the transmit buffer (or an inverse of the transmit data). In response to the copy of the transmit data not matching the pin output data, the loopback circuit outputs a pin flag to the receiving device, either through a flag pin or with a subsequent data block.

While the systems and methods for diagnostic coverage at an interface have been described above with respect to SPIs, it should be understood that the techniques described herein can be applied in other serial interfaces, such as interfaces following the Single Edge Nibble Transmission (SENT) protocol or the SENT protocol with Short PWM Code (SPC) enhancement. In particular, any combination or subset of the diagnostic techniques described herein, including sending different error detection values in user mode and test mode (e.g., by inverting the error detection value in test mode), clearing the buffer after reading, and including a loopback circuit, may be used in other types of interfaces.

SELECT EXAMPLES

Example 1 provides a serial interface that includes a data verification module and a data buffer. The data verification module is configured to select a first error detection value in response to a mode signal indicating a user mode; select a second error detection value in response to the mode signal indicating a test mode, the second error detection value different from the first error detection value; and generate transmit data for transmitting to a receiving device, the transmit data including output data and the selected one of the first error detection value and the second error detection value. The data buffer is configured to store the transmit data, the transmit data received at the data buffer from the data verification module; output the transmit data to an output pin; and, in response to receiving a clear signal from a read detector, clear the transmit data stored in the data buffer.

Example 2 provides the serial interface according to example 1, where the data verification module is configured to select, as the second error detection value, an inverse of the first error detection value in response to the mode signal indicating the test mode.

Example 3 provides the serial interface according to example 2, where the data verification module includes an XOR gate configured to receive the first error detection value at a first input, receive the mode signal at a second input, and invert the first error detection value to generate the second error detection value in response to a high state of the mode signal, the high state indicating the test mode.

Example 4 provides the serial interface according to any of the preceding examples, where the data verification module is configured to generate the first error detection value by computing a CRC value from the output data using a CRC polynomial.

Example 5 provides the serial interface according to any of the preceding examples, where the data verification module further includes a frame count module configured to retrieve a frame count, append the retrieved frame count to the output data, and increment the frame count, and where the data verification module is configured to generate the first error detection value by processing the output data with the appended frame count.

Example 6 provides the serial interface according to any of the preceding examples, where the serial interface further includes a read detector configured to detect transmission of the transmit data out of the data buffer and, in response to the detected transmission, send the clear signal to the data buffer.

Example 7 provides the serial interface according to any of the preceding examples, where the serial interface further includes a loopback circuit configured to receive pin output data from the output pin, compare the pin output data to a copy of the transmit data received from the data buffer, and, in response to the copy of the transmit data not matching the pin output data, output a pin flag to the receiving device.

Example 8 provide the serial interface according to example 7, where the loopback circuit includes a first memory configured to receive the transmit data from the data buffer and store one of the received transmit data and an inverse of the transmit data as the copy of the transmit data, a second memory configured to receive the pin output data from the output pin and store the pin output data, and a comparator configured to compare data from the first memory to data in the second memory and, in response to the data from the first memory not matching the data from the second memory, output the pin flag.

Example 9 provides a serial interface including a data buffer and a verification module. The data buffer is configured to store received data including a data block and an error detection value generated using an error detection code, the received data transmitted to the serial interface from a second serial interface of a transmitting device, the transmitting device alternately set in a user mode or a test mode. The verification module is configured to retrieve the received data from the data buffer; process the data block and the error detection value with the error detection code to attempt to verify the data block; process the data block and an inverse of the error detection value with the error detection code to attempt to verify the data block; and output a signal indicating that the transmitting device is set in the test mode in response to verifying the data block and the inverse of the error detection value with the error detection code.

Example 10 provides the serial interface according to example 9, where the error detection code is a CRC polynomial, and the error detection value is a CRC value.

Example 11 provides the serial interface according to example 9 or 10, where the serial interface verification module further includes a frame count check module configured to extract a frame count from the received data, retrieve a stored frame count, and compare the extracted frame count to the stored frame count to verify that the frame count of the received data has incremented correctly relative to prior received data.

Example 12 provides the serial interface according to any of examples 9 through 11, where the serial interface further includes a pin check module configured to receive a pin flag from the transmitting device, the pin flag indicating a pin failure on the transmitting device, and output a failure flag indicating that the transmitting device has a failure.

Example 13 provides the serial interface according to any of examples 9 through 12, where the serial interface is further configured to output a failure flag in response to a frame count of the received data not matching an expected frame count, and in response to neither of the first error detection code and the second error detection code verifying the data block.

Example 14 provides a method for transmitting data through a serial interface that includes receiving data for transmitting from the serial interface to a receiving device; selecting one of a first error detection value and a second error detection value in response to a mode signal, the first error detection value indicating a user mode, the second error detection value indicating a test mode; generating transmit data for transmitting to the receiving device, the transmit data including the received data and the selected first or second error detection value; storing the transmit data in a data buffer; outputting the transmit data from the data buffer to an output pin; and, in response to a clear signal indicating that the transmit data has been read from the data buffer, clearing the transmit data from the data buffer.

Example 15 provides the method according to example 14, where the second error detection value is an inverse of the first error detection value.

Example 16 provides the method according to example 15, where selecting one of the first error detection value and the second error detection value includes providing the first error detection value to a first input of an XOR gate; providing the mode signal to a second input of the XOR gate, where the mode signal in a first state indicates the test mode and the mode signal in an opposite state indicates the user mode; and outputting the one of the first error detection value and the second error detection value from the XOR gate.

Example 17 provides the method according to any of examples 14 through 16, where generating the first error detection code includes computing a CRC value from the received data using a CRC polynomial.

Example 18 provides the method according to any of examples 14 through 17, where the method further includes retrieving a stored frame count, appending the retrieved frame count to the received data, and incrementing the stored frame count, where the first error detection value is computed based on the received data and the appended frame count.

Example 19 provides the method according to any of examples 14 through 18, where the method further includes detecting, by a read detector, transmission of the transmit data out of the data buffer to the transmit pin; and, in response to the detected transmission, transmitting, from the read detector, the clear signal to the data buffer.

Example 20 provides the method according to any of examples 14 through 19, where the method further includes receiving pin output data from the output pin, comparing the pin output data to a copy of the transmit data received from the data buffer, and, in response to the copy of the transmit data not matching the pin output data, outputting a pin flag to the receiving device.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:
1. A serial interface, comprising:
 a data verification module to:
  select a first error detection value in response to a mode signal indicating a user mode, select a second error detection value in response to the mode signal indicating a test mode, the second error detection value being different from the first error detection value, generate transmit data for transmitting to a receiving device, the transmit data comprising output data and the selected one of the first error detection value or the second error detection value, append a frame count to the output data, and increment the frame count, wherein the data verification module is to select the first error detection value by processing the output data with the appended frame count; and a data buffer to:

store the transmit data, the transmit data received at the data buffer from the data verification modules, and output the transmit data to an output pin.

2. The serial interface of claim 1, wherein the data verification module is to select, as the second error detection value, an inverse of the first error detection value in response to the mode signal indicating the test mode.

3. The serial interface of claim 2, wherein the data verification module comprises an XOR gate to:

receive the first error detection value at a first input, receive the mode signal at a second input, and invert the first error detection value to generate the second error detection value in response to a high state of the mode signal, the high state indicating the test mode.

4. The serial interface of claim 1, wherein the data verification module is to generate the first error detection value by computing a cyclic redundancy check (CRC) value from the output data using a CRC polynomial.

5. The serial interface of claim 1, further comprising a read detector to:

detect transmission of the transmit data out of the data buffer, and in response to the detected transmission, send the clear signal to the data buffer.

6. The serial interface of claim 1, further comprising a loopback circuit to:

receive pin output data from the output pin, compare the pin output data to a copy of the transmit data received from the data buffer, and in response to the copy of the transmit data not matching the pin output data, output a pin flag to the receiving device.

7. The serial interface of claim 6, wherein the loopback circuit comprises:

a first memory to receive the transmit data from the data buffer and store one of the received transmit data and an inverse of the transmit data as the copy of the transmit data, a second memory to receive the pin output data from the output pin and store the pin output data, and a comparator to compare data from the first memory to data in the second memory and, in response to the data from the first memory not matching the data from the second memory, output the pin flag.

8. The serial interface of claim 1, wherein the data buffer is further to:

in response to receiving a clear signal from a read detector, clear the transmit data stored in the data buffer.

9. A serial interface, comprising:

a data buffer to store received data comprising a data block and an error detection value generated using an error detection code, the received data transmitted to the serial interface from a second serial interface of a transmitting device, the transmitting device alternately set in a user mode or a test mode; and a verification module to:

retrieve the received data from the data buffer, process the data block and the error detection value with the error detection code to attempt to verify the data block, process the data block and an inverse of the error detection value with the error detection code to attempt to verify the data block, output a signal indicating that the transmitting device is set in the test mode in response to verifying the data block and the inverse of the error detection value with the error detection code, and output a failure flag in response to a frame count of the received data not matching an expected frame count, and in response to failure in verifying the data block.

10. The serial interface of claim 9, wherein the error detection code is a cyclic redundancy check (CRC) polynomial, and the error detection value is a CRC value.

11. The serial interface of claim 9, wherein the verification module further comprises a frame count check module to:

extract a frame count from the received data, retrieve a stored frame count, and compare the extracted frame count to the stored frame count to verify that the frame count of the received data has incremented correctly relative to prior received data.

12. The serial interface of claim 9, further comprising a pin check module to:

receive a pin flag from the transmitting device, the pin flag indicating a pin failure on the transmitting device, and output a failure flag indicating that the transmitting device has a failure.

13. A method for transmitting data through a serial interface, the method comprising:

receiving data for transmitting from the serial interface to a receiving device;

selecting one of a first error detection value or a second error detection value in response to a mode signal, the first error detection value indicating a user mode, the second error detection value indicating a test mode;

generating transmit data for transmitting to the receiving device, the transmit data comprising the received data and the selected first error detection value or the second error detection value;

storing the transmit data in a data buffer;

outputting the transmit data from the data buffer to an output pin; comparing pin output data at the output pin to a copy of the transmit data received from the data buffer; and in response to the copy of the transmit data not matching the pin output data, outputting a pin flag to the receiving device.

14. The method of claim 13, wherein the second error detection value is an inverse of the first error detection value.

15. The method of claim 14, wherein selecting one of the first error detection value or the second error detection value comprises:

providing the first error detection value to a first input of an XOR gate, providing the mode signal to a second input of the XOR gate, wherein the mode signal in a first state indicates the test mode and the mode signal in an opposite state indicates the user mode, and outputting the one of the first error detection value or the second error detection value from the XOR gate.

16. The method of claim 13, wherein generating the first error detection value comprises computing a cyclic redundancy check (CRC) value from the received data using a CRC polynomial.

17. The method of claim 13, further comprising:
retrieving a stored frame count;
appending the retrieved frame count to the received data; and
incrementing the stored frame count;
wherein the first error detection value is computed based on the received data and the appended frame count.

18. The method of claim 13, further comprising:
detecting, by a read detector, transmission of the transmit data out of the data buffer to the output pin; and
in response to the detected transmission, transmitting, from the read detector, a clear signal to the data buffer, the clear signal indicating that the transmit data has been read from the data buffer.

19. The method of claim 13, further comprising:
in response to a clear signal indicating that the transmit data has been read from the data buffer, clearing the transmit data from the data buffer.

* * * * *